April 2, 1946.  F. KERTESZ  2,397,744
METALLIC COATING COMPOSITION AND STRUCTURE PRODUCED THEREFROM
Filed July 1, 1944
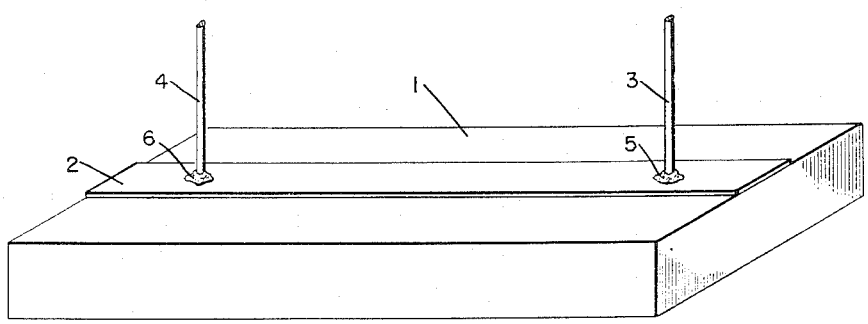
*Francois Kertesz*
INVENTOR.
BY
ATTORNEY

UNITED STATES PATENT OFFICE 2,397,744

METALLIC COATING COMPOSITION AND STRUCTURE PRODUCED THEREFROM

François Kertesz, Great Kills, Staten Island, N. Y., assignor to E. I. du Pont de Nemours & Company, Wilmington, Del., a corporation of Delaware Application July 1, 1944, Serial No. 543,192

13 Claims. (Cl. 189—36.5)

This invention relates to new and unique coating compositions and articles coated therewith. More specifically, this invention relates to coating compositions containing finely divided silver particles, and articles coated with such compositions, which have certain unique properties as hereinafter set forth.

There have recently been developed, coating compositions containing finely divided silver, or silver compound, particles together with particles of a vitreous flux, and liquid vehicle. Such compositions can be fired on a glass or ceramic base to produce a surface thereon containing metallic silver particles in a vitreous matrix. The resulting metallic surfaces can be burnished, or electroplated, and metallic objects can be readily soldered thereto. These recently developed coating compositions are, therefore, highly useful as a means for producing soldered joints and connections between metal structures and glass or ceramic structures.

Since the above-described coating compositions must be fired at a temperature of the order of 1000° F. or higher, to produce a useful bond with the glass or ceramic, they can only be used to produce a solderable metal surface on a glass or ceramic structure, or a structure which will withstand the relatively high firing temperature.

It has long been desired to form a strongly adherent, solderable metallic surface on any base material, particularly on base material which will not withstand a high temperature. Any previous attempt to produce a strongly adherent, solderable metallic surface on a base without the use of a high bonding or firing temperature has been unsuccessful.

It is an object of this invention to produce a coating composition containing finely divided metallic silver, which composition can be applied to any base material to form thereon a strongly adherent, solderable metallic surface.

It is another object of this invention to produce a strongly adherent metallic surface on any base material.

It is still a further object of this invention to produce a coating composition containing finely divided metallic silver, which composition can be applied to any base material at room temperature or temperatures slightly above room temperature to form on the base material a strongly adherent, solderable metallic surface.

Other objects of the invention will appear hereinafter.

The above objects may be accomplished, in general, by preparing a coating composition containing finely divided metallic silver particles and a butyl methacrylate polymer dissolved in a solvent therefor. The coating composition can be applied to a base and the solvent removed by evaporation at room temperature or by mild baking temperatures. The resulting coating will adhere firmly to substantially any base material, and metallic objects can be soldered directly to the adherent metal coating.

The accompanying drawing is a diagrammatic illustration clearly showing the principles of the present invention.

In the drawing, reference numeral 1 designates a base material which may be wood, a plastic material such as a synthetic resin, cellulose derivative or the like. A coating 2 comprising a butyl methacrylate polymer containing finely divided silver particles as referred to in more detail below, is applied to the base 1. The coating 2, after removal of the solvent therefrom, will readily accept a solder as illustrated. As a result of the characteristic of the coating 2, wires 3 and 4 may be directly soldered to the coating 2. The solder holding the wires 3 and 4 to the coating 2 is illustrated respectively by reference numerals 5 and 6.

In order that the coating composition will be strongly adherent to a base material and will produce on said base a solderable surface, the ratio of metallic silver particles to butyl methacrylate polymer in the composition should be between 4 to 1 and 10 to 1, by weight, and preferably between 4½ to 1, and 6 to 1. It is preferred that the metallic silver particles be freshly prepared and have a bright surface. Preferably, the silver particles should be sufficiently finely divided to pass through a 20-mesh screen. (20 meshes per linear inch). They may, however, be somewhat larger and considerably smaller than 20-mesh size.

The butyl methacrylate polymer may be polymerized iso-butyl methacrylate or normal-butyl methacrylate. Preferably, the polymer should consist wholly of iso- or normal-butyl methacrylate, however, interpolymers of butyl methacrylate and other monomers which are polymerizable with butyl methacrylate (for example, methyl or ethyl methacrylate, vinyl acetate or vinyl chloride, etc.) may be used if at least 75% of the interpolymer is composed of the iso- or normal-butyl methacrylate. The term "butyl methacrylate polymer" as used throughout the specification and claims is intended to include both polymerized iso-butyl and normal-butyl methacrylate as well as interpolymers containing at least 75% of iso- and normal-butyl methacrylate. The butyl methacrylate polymer should have a molecular weight of at least 5,000 and preferably a molecular weight of between 15,000 and 50,000.

In preparing the coating composition of this invention, the butyl methacrylate polymer should be dissolved in a solvent therefor. Any solvent which will dissolve the butyl methacrylate polymer may be used for this purpose, however, I prefer to use a volatile organic solvent which can readily be removed from the coating. As solvents which may be used in accordance with this invention, the following may be named: acetone, methyl-ethyl ketone, methyl acetate, ethyl acetate, toluene, benzene, xylene, chlorobenzene, dichlor-diethyl ether, commercial high solvency naphtha or mixtures of these with or without other organic solvents. The quantity of solvent incorporated in the coating composition is not critical and may be varied between wide limits. The method of application and the thickness of the coating desired, will determine to a large extent the proportion of solvent in the coating composition. The coating composition may be applied to a base in any desired manner, for example, by spraying, brushing, dipping, or by pressing the same through a screen stencil by means of a squeegee. Preferably, the coating composition is applied in sufficient thickness to produce a final dried coating having a thickness of at least .00005 to .001 inch. If desired, a plurality of coatings may be applied to build up the film to any desired thickness.

The coating composition, after application to the desired base, is thoroughly dried. If a volatile solvent such as acetone, toluene, benzene or xylene is used as a solvent in the coating composition, the coated base may be dried at room temperature with or without application of air current. If less volatile solvents, such as chlorobenzene or dichlor-diethyl ether, are used as the solvent, it may be desirable to dry the coating by means of a mild baking at a temperature not to exceed about 150° C.

The coating composition of this invention can be applied to substantially any stable permanent base to produce thereon a solderable surface. For example, it may be applied to plastic bases, for example, bases composed of phenol-formaldehyde resin, urea-formaldehyde resin, methyl methacrylate resins, glass or ceramic bases, metals, paper, wood, cellulose acetate, regenerated cellulose, vulcanized hard rubber, or hard synthetic rubber or the like. If applied to a porous material, such as wood, paper or a fabric, it is desirable to first impregnate the porous material with a substance that will seal the pores thereof, for example, a paint, resin or varnish.

After application and drying of the coating composition of this invention, the resulting surface will contain the metallic silver particles embedded in a tough adherent film of the butyl methacrylate polymer. This surface containing metallic silver is readily wetted with solder and the application of the hot solder does not appear to materially deteriorate, destroy or damage the coating. Ordinary commercially so-called soft solder containing about equal parts of lead and tin can be used to firmly connect or join the base containing the coating to metal objects and structures which are also wet with solder.

The following detailed examples which set forth several preferred coating compositions and methods for producing solderable coatings or bases are given for illustrative purposes. It is to be understood, however, that the invention is not limited to the specific details of the examples.

*Example I*

A polymer having a molecular weight of 25,000 and consisting of polymerized iso-butyl methacrylate is dissolved in a solvent mixture comprising 50% high solvency naphtha, 25% butanol and 25% xylene in the proportion of 43% of the polymer and 57% of the solvent mixture. Metallic silver particles of such a size that they will pass through a 50-mesh screen are mixed with the polymer solution in the proportion, by weight, of silver particles to polymer of 5 to 1. The solution is stirred until the silver particles are uniformly dispersed throughout the body of the composition. The resulting viscous composition is then thinned to spraying consistency by addition of a mixture of xylene and butanol in a proportion of 1 to 1.

The thinned composition is then applied by means of a brush or spraying to a plate composed of Lucite resin (polymerized methylmethacrylate) and allowed to dry for 10 hours by standing in the atmosphere at room temperature. A copper lead wire is soldered to the dry metallic coating. After setting of the solder, the lead wire can only be pulled from the plate with difficulty.

*Example II*

A polymer having a molecular weight of 20,000 and consisting of polymerized normal-butyl methacrylate is dissolved in toluene in the proportion of 40% of the polymer and 60% of toluene. Metallic silver particles having a 50-mesh size are mixed with the polymer solution, in the proportion of silver to polymer of 6:1, until thoroughly dispersed therein. The solution is thinned with an additional quantity of toluene to obtain the consistency of paint or varnish. The thinned solution is applied to wood which was previously impregnated with a phenol-formaldehyde resin. The coating is allowed to dry for a period of 5 hours. A copper wire is soldered on the surface of the dry coating. The copper wire adheres so firmly to the coated wood that it can only be removed by gradually prying it off with an instrument. In some places, the wood splits and adheres to the wire.

Throughout the specification and claims, percentages, parts and proportions refer to percentages, parts and proportions by weight unless otherwise specified.

Since it is obvious that many changes and modifications can be made in the above described details without departing from the nature and spirit of the invention, it is to be understood that the invention is not to be limited to said details except as set forth in the appended claims.

I claim:

1. A coating composition comprising a butyl methacrylate polymer containing at least 75% butyl methacrylate and having a molecular weight of at least 5,000, dissolved in a solvent therefor, and dispersed therein finely divided metallic silver in an amount between 4 and 10 times the weight of the polymer.

2. A coating composition comprising a butyl methacrylate polymer containing at least 75% butyl methacrylate and having a molecular weight of at least 5,000, dissolved in a solvent therefor, and dispersed therein finely divided metallic silver in an amount between 4½ and 6 times the weight of the polymer.

3. A coating composition comprising a butyl methacrylate polymer containing at least 75% butyl methacrylate and having a molecular weight of at least 5,000, dissolved in a volatile organic solvent therefor, and dispersed therein finely divided metallic silver in an amount between 4 and 10 times the weight of the polymer.

4. A coating composition comprising a butyl methacrylate polymer containing at least 75% butyl methacrylate and having a molecular weight between 15,000 and 50,000, dissolved in a solvent therefor, and dispersed therein finely divided metallic silver in an amount between 4 and 10 times the weight of the polymer.

5. A coating composition comprising a butyl methacrylate polymer containing at least 75% butyl methacrylate and having a molecular weight of between 15,000 and 50,000, dissolved in a mixed solvent comprising high solvency naphtha, butanol and xylene, and dispersed therein finely divided metallic silver in an amount between 4 and 10 times the weight of the polymer.

6. A solderable structure comprising a base, a coating on said base, said coating comprising a butyl methacrylate polymer containing at least 75% butyl methacrylate and having a molecular weight of at least 5,000 and containing dispersed therein finely divided metallic silver in an amount between 4 and 10 times the weight of the polymer.

7. A solderable structure comprising a base, a coating on said base, said coating comprising a butyl methacrylate polymer containing at least 75% butyl methacrylate and having a molecular weight of between 15,000 and 50,000 and containing dispersed therein finely divided metallic silver in an amount between 4 and 10 times the weight of the polymer.

8. A solderable structure comprising a base, a coating on said base, said coating comprising a butyl methacrylate polymer containing at least 75% butyl methacrylate and having a molecular weight of between 15,000 and 50,000 and containing dispersed therein finely divided metallic silver in an amount between 4½ and 6 times the weight of the polymer.

9. A solderable structure comprising a base composed of a rigid plastic material, a coating on said base, said coating comprising a butyl methacrylate polymer containing at least 75% butyl methacrylate and having a molecular weight of at least 5,000 and containing dispersed therein finely divided metallic silver in an amount between 4 and 10 times the weight of the polymer.

10. A solderable structure comprising a base composed of a rigid plastic material, a coating on said base, said coating comprising a butyl methacrylate polymer containing at least 75% butyl methacrylate and having a molecular weight of between 15,000 and 50,000 and containing dispersed therein finely divided metallic silver in an amount between 4 and 10 times the weight of the polymer.

11. A solderable structure comprising a base composed of a rigid plastic material, a coating on said base, said coating comprising a butyl methacrylate polymer containing at least 75% butyl methacrylate and having a molecular weight of between 15,000 and 50,000 and containing dispersed therein finely divided metallic silver in an amount between 4½ and 6 times the weight of the polymer.

12. As a new article of manufacture, a base, a coating on said base, said coating comprising a butyl methacrylate polymer containing at least 75% butyl methacrylate and having a molecular weight of at least 5,000 and containing dispersed therein finely divided metallic silver in an amount between 4 and 10 times the weight of the polymer, and a metal object soldered to said coating.

13. As a new article of manufacture, a base, a coating on said base, said coating comprising a butyl methacrylate polymer containing at least 75% butyl methacrylate and having a molecular weight between 15,000 and 50,000 and containing dispersed therein finely divided metallic silver in an amount between 4 and 10 times the weight of the polymer, and a metal object soldered to said coating.

FRANÇOIS KERTESZ.

Certificate of Correction

Patent No. 2,397,774.   April 2, 1946.

DONALD J. BUCKLEY

It is hereby certified that error appears in the printed specification of the above numbered patent requiring correction as follows: Page 2, second column, line 28, claim 2, for "coumarone, an indene" read *coumarone indene*; and that the said Letters Patent should be read with this correction therein that the same may conform to the record of the case in the Patent Office.

Signed and sealed this 21st day of May, A. D. 1946.

[SEAL]

LESLIE FRAZER,
*First Assistant Commissioner of Patents.*